Nov. 6, 1928.
F. H. WILLCOX
STEAM PLANT
Filed May 17, 1924
1,690,389
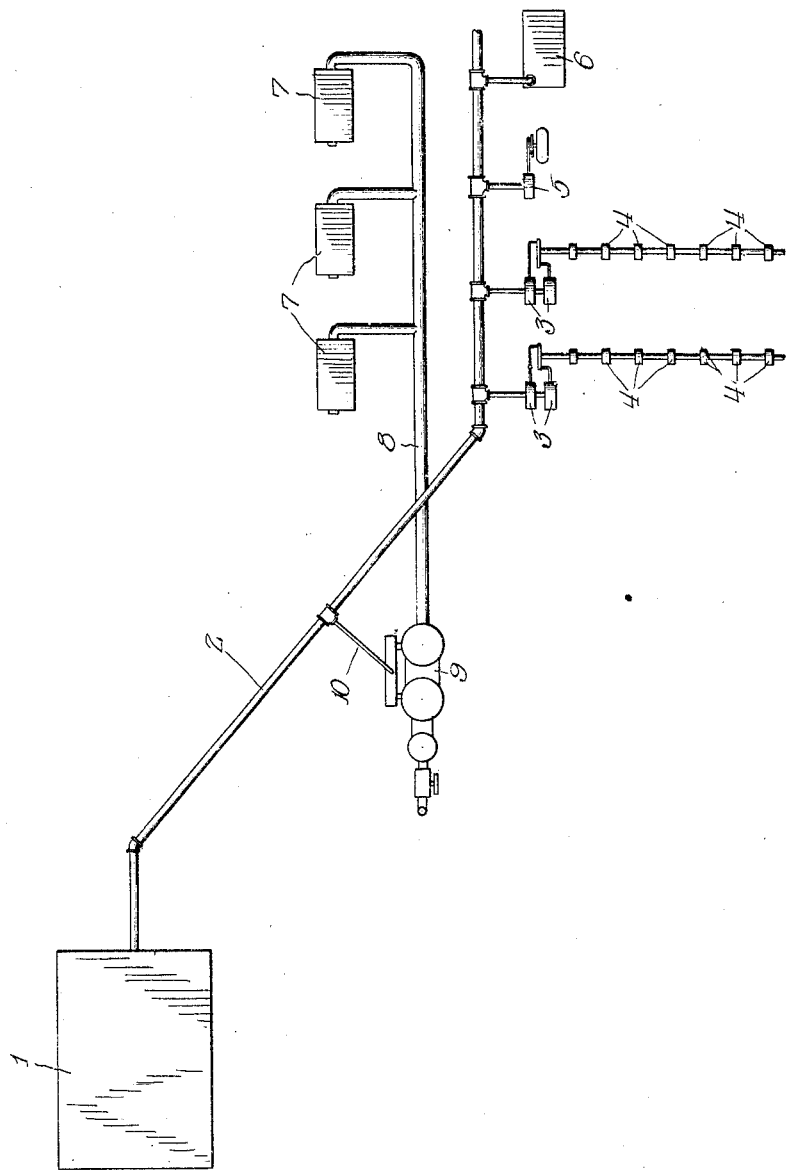
Witness:
R. Burkhardt
Inventor:
Frederick H Willcox,
By Wilkinson, Huxley, Byron & Knight.
Attys Patented Nov. 6, 1928.

1,690,389

UNITED STATES PATENT OFFICE.

FREDERICK H. WILLCOX, OF CHICAGO, ILLINOIS, ASSIGNOR TO FREYN ENGINEERING COMPANY, OF CHICAGO, ILLINOIS, A CORPORATION OF MAINE.

STEAM PLANT.

Application filed May 17, 1924. Serial No. 713,968.

The present invention relates to steam plants.

More particularly the present invention relates to steam plants involving steam using devices which are subject to wide variations in load, which plants also employ devices which emit waste heat.

An object of the present invention is to provide a steam plant which is subject to wide variations in steam demand, which plant will economically utilize waste heat for supplying the peaks of said fluctuating demand.

A further object is to provide a steam plant involving a coal fired boiler, a steam line, steam using devices which present a fluctuating demand for steam, waste heat emitting devices and means utilizing the waste heat from said heat emitting devices for supplementing said coal fired boiler and supplying the demands of said steam using devices.

A further object is to provide a system useful in connection with stoker fired boilers which are subject to wide variations in steam demand, which system will permit a smaller supply of fuel to the stoker when heavy demands occur, whereby the unnecessary consumption of fuel will be minimized.

A further object is to provide a method for operating a steam plant involving a steam generating boiler and waste heat emitting devices.

Further objects will appear as the description proceeds.

The one figure of the drawing represents diagrammatically a steam plant embodying the principles of the present invention.

The numeral 1 indicates a boiler house, which supplies steam to the steam line 2. The boilers within the boiler house 1 may be fired by means of oil, gas, coal, or any other desired fuel, and if coal is used, said boilers may be either hand fired or stoker fired. Connected to the steam line 2 are a number of steam using devices, as for example—rolling mill engines 3—3 which drive rolling mills 4—4, an electric generator 5 and a picking bath 6.

The numerals 7—7 represent heating furnaces, as for example—metallurgical appliances inclusive of small open hearths, puddling furnaces, malleable iron furnaces and the like, which emit waste heat, delivering heated gases to the waste gas flue 8. Ordinarily, the amount of waste heat emitted will be substantially constant. The numeral 9 indicates a waste heat boiler which should have a relatively high water capacity, and for this reason it is preferred to use a fire tube boiler. By the term "relatively large water capacity" it is meant that said waste heat boiler 9 comprises an accumulator having a relatively large storage space compared to an ordinary waste heat boiler of the size requisite for utilizing the waste heat from the waste heat emitting devices associated therewith. The construction referred to not only results in a high efficiency in transformation of the heat of the waste gases into steam but also provides a relatively large storage space for hot water. The steam space of the waste heat boiler 9 has communication with the steam line 2 through the line 10. The hot water within the waste heat boiler 9 is therefore at the temperature and pressure of the steam within the steam line 2.

With the plant running under average conditions, steam is continually generated by the boilers in the boiler house 1 and delivered to the main steam line 2. At the same time waste heat will be supplied by the devices 7—7 to raise the temperature of the water within the boiler 9. Under the conditions referred to, the boilers in the boiler house 1 and the waste heat boiler 9 will be steaming evenly. If the demand for steam slackens, the pressure within the steam line 2 will tend to rise and the waste heat from the devices 7—7 will be stored up in the boiler 9 in the form of hot water. If the demand for steam rises, the pressure in the steam line 2 will tend to lower and the heat energy stored in the water in the boiler 9 is instantly released in the form of available steam. It will be evident that the variation in the steam supplied by the boilers in boiler house 1 will be less, in proportion to the amount of steam available from the waste heat boiler 9.

In explaining the advantages of the present invention the following facts may be set forth. Assuming that the boilers within the boiler house 1 are coal fired, either by hand or by stoker, if the boilers within the boiler house 1 were the only available means for supplying steam, a sudden increase in steam demand would require the application of an increased amount of coal in the fire boxes of said boilers in boiler house 1. If the heavy demand for steam is of short duration, the extra amount of fuel which was supplied to the boilers in boiler house 1 will be uselessly burned. By reason of the present invention, in which the boiler 9 is at all times connected to the steam line 2 for storing up energy when the pressure in steam line 2 is high and for instantly supplying steam when the pressure within the steam line 2 tends to lower, the amount of coal which need be supplied to the boilers in the boiler house 1 may be set at a materially lower figure.

Explaining the advantages of the present invention in other language, it may be stated that said invention involves a waste heat boiler of large water storage capacity, (preferably a fire tube boiler), which boiler acts as an accumulator and storage means for the heat in waste gases of combustion, said boiler releasing said heat into the main steam head of a steam plant when steam pressures are falling in consequence of a heavy load outstepping the output of the main boiler house. Conversely, said waste heat boiler accumulates heat when the steam pressures rise due to a low load upon the plant and the steam consumption in said plant is less than the going evaporation rate of the main boiler plant.

Though a preferred embodiment of the present invention has been described in detail, many modifications will occur to those skilled in the art. It is intended to cover all such modifications that fall within the scope of the invention as defined by the appended claims.

What is claimed is:

1. In a steam plant, a main steam generator, a steam line connected thereto, waste heat emitting devices, and an accumulator for storing up in the form of hot water the heat emitted by said waste heat emitting devices, said accumulator being connected to said steam line, said accumulator having a relatively large water storage space compared to an ordinary waste heat boiler of the size requisite for utilizing the waste heat from said waste heat emitting devices.

2. In a steam plant, coal fired boilers, a steam line supplied thereby, waste heat emitting devices, a heat accumulator supplied by said devices and means connecting the steam space of said accumulator with said steam line, said accumulator having a relatively large water storage space compared to an ordinary waste heat boiler of the size requisite for utilizing the waste heat from said waste heat emitting devices.

3. In combination, a main steam generator, a steam line supplied thereby, waste heat emitting devices, an accumulator comprising a waste heat boiler connected to be supplied by the waste heat from said waste heat emitting devices, said accumulator being connected to said steam line whereby to be instantly available to supply steam to said steam line upon reduction of steam pressure within said steam line, said accumulator having a relatively large water storage space compared to an ordinary waste heat boiler of the size requisite for utilizing the waste heat from said waste heat emitting devices.

Signed at Chicago, Illinois, this 14th day of May, 1924.

FREDERICK H. WILLCOX.